No. 760,183. Patented May 17, 1904.

UNITED STATES PATENT OFFICE.

LAWSON CHASE, OF PHILADELPHIA, PENNSYLVANIA.

PROCESS OF MANUFACTURING ARTIFICIAL STONE.

SPECIFICATION forming part of Letters Patent No. 760,183, dated May 17, 1904.

Original application filed February 20, 1903, Serial No. 144,267. Divided and this application filed May 12, 1903. Serial No. 156,824. (No specimens.)

*To all whom it may concern:*

Be it known that I, LAWSON CHASE, a citizen of the United States of America, residing at Philadelphia, in the county of Philadelphia and State of Pennsylvania, have invented certain new and useful Improvements in Processes of Manufacturing Artificial Stone, of which the following is a specification.

My invention relates to improvements in the process or method of manufacturing artificial stone, and has for its objects the extension of the field of usefulness to which such a product may be applied and to provide a homogeneous material of this nature which shall be impervious to moisture, non-expansive, non-conductive, non-hydroscopic, (and thus frost-proof,) non-contracting, and one which will insure protection from the effects of electrolysis and corrosion.

The artificial stone prepared according to my process will become harder with age or immersion in water and will neither rot, rust, nor corrode, besides possessing antiseptic properties.

A further object is to cheapen the cost of manufacture as well as the cost of the materials or ingredients employed in such manufacture.

This application is a divisional part of the application filed by me upon the 20th day of February, A. D. 1903, Serial No. 144,267, to which reference may be had for a more extended description of the ingredients and component parts of the artificial stone produced by the process herein set forth.

My invention contemplates and constitutes an improvement upon that set forth in Letters Patent No. 562,201, granted June 16, 1896, to one George G. Schroeder, of which Letters Patent I am the owner. In this patent it will be observed that the inventor first melts rosin in a receptacle, next mixes therewith and in the same receptacle pebbles or broken stone, the mixture being agitated, then adds sand thereto and in the same receptacle, thoroughly mixing the entire mass, then adds cement, and, lastly, sulfate of copper. The entire compound is commingled in the one receptacle, the ingredients being added thereto from time to time. In my process I dispense entirely with this method, especially in view of the fact that my process is intended and I so use it for the production of large quantities of my improved artifical stone, and instead I commingle the various ingredients and elements by an entirely different method or process. By so doing I am enabled to produce a much better and cheaper article and one which possesses a greater utility as well as accomplishing much better results than can be obtained by adhering to the method set forth in the patent above referred to.

My method or process of manufacturing artificial stone is as follows: I take about ninety per cent., by weight, of filler or filling material—such as sand or gravel, pebbles, broken stone or rock, earth, slag, or other suitable material, as inorganic matter—and heat the same until it attains a temperature of about 210° Fahrenheit in any suitable manner in a suitable receptacle, but preferably under agitation, as in a rotating heating-drum, which may be portable or stationary, as desired. About ten per cent., by weight, of a binder, such as rosin, is also heated, preferably by steam, to about the same temperature in a receptacle separate from that in which the filler is heated, thereby reducing the rosin to liquid form, and the binder may be stirred or agitated while heating. This heating should be regulated with care to avoid burning the rosin, which would render it totally unfit for my purposes and ruin the compound. About one-quarter of one per cent., by weight, of a hardening and settling ingredient—as sulfate of copper, manganese, sulfur, or other suitable compound—is heated in a receptacle separate from the others to approximately the same temperature. The contents of the three separate receptacles—the filler, the binder, and the hardener—are then poured simultaneously into the receiving end of a suitable mixer, subjected to heat or not, wherein the elements are quickly and thoroughly commingled, the resulting mastic issuing from the discharge end of the mixer, either in bulk or in a continuous stream, as preferred, the entire process being continuous and uninterrupted so long as the various ingredients are supplied to their respective receptacles, and this mastic may be poured directly into molds or laid in any suitable and convenient manner.

Instead of previously heating the binder (rosin) it may be pulverized or ground while dry and fed directly to the mixer, together with the heated filler and the hardener, and when the manufactured material is designed for certain uses, such as in the construction of heavy conduits, it may be well to pulverize and commingle the binder (rosin) and the hardener while both are in a dry state, permitting them to remain so for a time—say about two weeks—before using, whereby a subtle chemical change takes place therebetween. In this instance the commingled binder and hardener may be fed directly into the mixer, together with the heated filler, or they may be previously heated before being introduced into the mixer. Again, it may be preferable, as when the material is to be used for heavy foundations, to commingle the binder and the hardener in suitable proportions either before or while subjecting them to heat, and in this case the mixture is allowed to stand for a short time—say three or four days—before commingling it with the heated filler in the mixer. Of course it will be necessary to reheat the mixture before supplying it to the mixer.

In cases where it is preferable or necessary to have foundations, walls, and heavy conduits built in sections instead of in a homogeneous mass the elements may be commingled and the product molded under pressure into the desired size and shape.

In general the ingredients are all thoroughly commingled while in a heated state in the mixer, and they unite to form a smooth hard grayish homogeneous mass which quickly solidifies or hardens to a stone-like degree. The material can be cast or formed into a solid homogeneous piece, thus constituting a much stronger construction than if it were composed of several distinct pieces fused together. No complicated machinery, expert labor, or expensive ingredients are required or needed.

It will be easily understood from the foregoing that the proportions of the ingredients as given may be varied as well as changes made in the method or process set forth without materially departing from the spirit and scope of my invention, and hence I do not wish to limit myself to the exact method or process herein set forth; but, Having fully set forth my process, what I claim as new, and desire to secure by Letters Patent, is—

1. The method or process of producing stone mastic consisting in heating the filler and feeding the filler, the binder and the hardener simultaneously.

2. The process or method of producing an artificial stone consisting in heating the filler and the binder and hardener separately and then feeding and mixing them simultaneously.

3. The continued and uninterrupted process of producing artificial stone consisting in heating the filler, the binder and the hardener each separately and then feeding and commingling them independently of one another and, during which commingling the mass is subjected to heat.

4. The process of manufacturing artificial stone consisting in heating a filler, a binder and a hardening and setting ingredient separately, the binder being heated to a temperature below its burning-point and then mixing the binder, filler and hardening ingredient.

5. The process of manufacturing artificial stone consisting in heating a filler under agitation, a binder and a hardener, each separately and commingling the ingredients.

6. The continuous and uninterrupted process of manufacturing artificial stone consisting in heating a filler, a binder and a hardener, each separately and feeding the ingredients when hot into a mixer, the completed material constantly issuing so long as the ingredients are fed.

7. The process of manufacturing artificial stone consisting in separately heating a hardener and setter and agitated filler and binder ingredients, the heating of the binder being regulated and commingling the ingredients.

8. The process of manufacturing artificial stone consisting in separately heating a filler and a hardening and setting ingredient, and simultaneously mixing them together with a binder.

9. The continuous process of manufacturing artificial stone consisting in heating a filler, a binder and a hardener and setter separately, commingling the ingredients and laying the material as it constantly issues, in a solid integral homogeneous structure.

10. The process of manufacturing artificial stone consisting in separately heating a comminuted binder and a hardener and setter, and a filler and then commingling the ingredients.

11. The process of manufacturing artificial stone consisting in separately heating a filler and a comminuted binder and a hardener and setter and then simultaneously commingling the ingredients.

In testimony whereof I have signed my name to this specification in the presence of two subscribing witnesses.

LAWSON CHASE.

Witnesses:
  JAMES C. ENBURG,
  JOHN M. ENBURG.